US011843955B2

(12) United States Patent
Cavcic et al.

(10) Patent No.: US 11,843,955 B2
(45) Date of Patent: Dec. 12, 2023

(54) INSTALLATION OF REPEATERS FOR A MILLIMETER WAVE COMMUNICATIONS NETWORK

(71) Applicant: Pivotal Commware, Inc., Kirkland, WA (US)

(72) Inventors: Mersad Cavcic, Kirkland, WA (US); Brian Mark Deutsch, Issaquah, WA (US); Brett Daniel Mills, Seattle, WA (US); Sameer Lalwani, San Diego, CA (US)

(73) Assignee: Pivotal Commware, Inc., Bothell, WA (US)

( * ) Notice: Subject to any disclaimer, the term of this patent is extended or adjusted under 35 U.S.C. 154(b) by 0 days.

(21) Appl. No.: 17/576,832

(22) Filed: Jan. 14, 2022

(65) Prior Publication Data
US 2022/0232396 A1  Jul. 21, 2022

Related U.S. Application Data

(60) Provisional application No. 63/138,306, filed on Jan. 15, 2021.

(51) Int. Cl.
*H04W 16/26* (2009.01)
*H04B 7/155* (2006.01)
*H04W 16/18* (2009.01)

(52) U.S. Cl.
CPC ........ *H04W 16/26* (2013.01); *H04B 7/15507* (2013.01); *H04W 16/18* (2013.01)

(58) Field of Classification Search
CPC ... H04W 16/26; H04W 16/18; H04B 7/15507
See application file for complete search history.

(56) References Cited

U.S. PATENT DOCUMENTS

| 2,131,108 | A | 9/1938 | Lindenblad |
| 4,464,663 | A | 8/1984 | Lalezari et al. |
| 6,133,880 | A | 10/2000 | Grangeat et al. |
| 6,150,987 | A | 11/2000 | Sole et al. |
| 6,529,745 | B1 | 3/2003 | Fukagawa et al. |

(Continued)

FOREIGN PATENT DOCUMENTS

| CN | 102948089 A | 2/2013 |
| CN | 103700951 A | 4/2014 |

(Continued)

OTHER PUBLICATIONS

Falconer, D.D. and DeCruyenaere, J.P., 2003. Coverage enhancement methods for LMDS. IEEE Communications Magazine, 41(7), pp. 86-92.*

(Continued)

*Primary Examiner* — Zhitong Chen
(74) *Attorney, Agent, or Firm* — John W. Branch; Branch Partners PLLC

(57) ABSTRACT

Mobile communications base stations, such as 5G wireless communications base stations operating at millimeter wave (mmW) frequencies, may have limited spatial coverage due to issues such as limited line of sight or attenuation from foliage or structures. Line of sight and attenuation can be modeled to recommend placement of repeaters for expanded spatial coverage. The repeaters can include open-air repeaters and window repeaters.

27 Claims, 6 Drawing Sheets

(56) References Cited

U.S. PATENT DOCUMENTS

| | | |
|---|---|---|
| 6,680,923 B1 | 1/2004 | Leon |
| 7,084,815 B2 | 8/2006 | Phillips et al. |
| 7,205,949 B2 | 4/2007 | Turner |
| 8,711,989 B1 | 4/2014 | Lee et al. |
| 9,356,356 B2 | 5/2016 | Chang et al. |
| 9,385,435 B2 | 7/2016 | Bily et al. |
| 9,450,310 B2 | 9/2016 | Bily et al. |
| 9,551,785 B1 | 1/2017 | Geer |
| 9,608,314 B1 | 3/2017 | Kwon et al. |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,813,141 B1 | 11/2017 | Marupaduga et al. |
| 9,936,365 B1 | 4/2018 | Elam |
| 9,955,301 B2 | 4/2018 | Markhovsky et al. |
| 10,033,109 B1 | 7/2018 | Gummalla et al. |
| 10,225,760 B1 | 3/2019 | Black |
| 10,277,338 B2 | 4/2019 | Reial et al. |
| 10,313,894 B1 | 6/2019 | Descios et al. |
| 10,324,158 B2 | 6/2019 | Wang et al. |
| 10,431,899 B2 | 10/2019 | Bily et al. |
| 10,468,767 B1 | 11/2019 | McCandless et al. |
| 10,505,620 B2 | 12/2019 | Ito et al. |
| 10,522,897 B1 | 12/2019 | Katko et al. |
| 10,673,646 B1 | 6/2020 | Shinar et al. |
| 10,734,736 B1 | 8/2020 | McCandless et al. |
| 11,069,975 B1 | 7/2021 | Mason et al. |
| 11,088,433 B2 | 8/2021 | Katko et al. |
| 11,190,266 B1 | 11/2021 | Black et al. |
| 11,252,731 B1 | 2/2022 | Levitsky et al. |
| 11,424,815 B2 | 8/2022 | Black et al. |
| 11,463,969 B2 | 10/2022 | Li et al. |
| 2001/0005406 A1 | 6/2001 | Mege et al. |
| 2002/0196185 A1 | 12/2002 | Bloy |
| 2003/0025638 A1 | 2/2003 | Apostolos |
| 2003/0062963 A1 | 4/2003 | Aikawa et al. |
| 2004/0003250 A1 | 1/2004 | Kindberg et al. |
| 2004/0038714 A1 | 2/2004 | Rhodes et al. |
| 2004/0229651 A1 | 11/2004 | Hulkkonen et al. |
| 2005/0237265 A1 | 10/2005 | Durham et al. |
| 2005/0282536 A1 | 12/2005 | McClure et al. |
| 2006/0025072 A1 | 2/2006 | Pan |
| 2007/0024514 A1 | 2/2007 | Phillips et al. |
| 2007/0147338 A1 | 6/2007 | Chandra et al. |
| 2007/0184828 A1 | 8/2007 | Majidi-Ahy |
| 2007/0202931 A1 | 8/2007 | Lee et al. |
| 2008/0039012 A1 | 2/2008 | McKay et al. |
| 2008/0049649 A1 | 2/2008 | Kozisek et al. |
| 2008/0181328 A1 | 7/2008 | Harel et al. |
| 2009/0153407 A1 | 6/2009 | Zhang et al. |
| 2009/0176487 A1 | 7/2009 | DeMarco |
| 2009/0207091 A1 | 8/2009 | Anagnostou et al. |
| 2009/0231215 A1 | 9/2009 | Taura |
| 2009/0296938 A1 | 12/2009 | Devanand et al. |
| 2010/0197222 A1 | 8/2010 | Scheucher |
| 2010/0207823 A1 | 8/2010 | Sakata et al. |
| 2010/0248659 A1 | 9/2010 | Kawabata |
| 2010/0302112 A1 | 12/2010 | Lindenmeier et al. |
| 2011/0070824 A1 | 3/2011 | Braithwaite |
| 2011/0199279 A1 | 8/2011 | Shen et al. |
| 2011/0292843 A1 | 12/2011 | Gan et al. |
| 2012/0064841 A1 | 3/2012 | Husted et al. |
| 2012/0094630 A1 | 4/2012 | Wisnewski et al. |
| 2012/0194399 A1 | 8/2012 | Bily et al. |
| 2013/0059620 A1 | 3/2013 | Cho |
| 2013/0069834 A1 | 3/2013 | Duerksen |
| 2013/0141190 A1 | 6/2013 | Kitaoka et al. |
| 2013/0231066 A1 | 9/2013 | Zander et al. |
| 2013/0303145 A1 | 11/2013 | Harrang et al. |
| 2013/0324076 A1 | 12/2013 | Harrang |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0269417 A1 | 9/2014 | Yu et al. |
| 2014/0293904 A1 | 10/2014 | Dai et al. |
| 2014/0308962 A1 | 10/2014 | Zhang et al. |
| 2014/0349696 A1 | 11/2014 | Hyde et al. |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0131618 A1 | 5/2015 | Chen |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0236777 A1 | 8/2015 | Akhtar et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0198334 A1 | 7/2016 | Bakshi et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0345221 A1 | 11/2016 | Axmon et al. |
| 2016/0365754 A1 | 12/2016 | Zeine et al. |
| 2016/0373181 A1 | 12/2016 | Black et al. |
| 2017/0085357 A1 | 3/2017 | Shahar |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1 | 7/2017 | Chawgo et al. |
| 2017/0195054 A1 | 7/2017 | Ashrafi |
| 2017/0238141 A1 | 8/2017 | Lindoff et al. |
| 2017/0310017 A1 | 10/2017 | Howard |
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1 | 1/2018 | Olsen et al. |
| 2018/0019798 A1 | 1/2018 | Khan et al. |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0123692 A1* | 5/2018 | Leiba .............. H04B 10/808 |
| 2018/0177461 A1 | 6/2018 | Bell et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1 | 10/2018 | Black et al. |
| 2018/0337445 A1 | 11/2018 | Sullivan et al. |
| 2018/0368389 A1 | 12/2018 | Adams |
| 2019/0020107 A1 | 1/2019 | Polehn et al. |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1 | 7/2019 | Klassen et al. |
| 2019/0221931 A1 | 7/2019 | Black et al. |
| 2019/0289482 A1 | 9/2019 | Black |
| 2019/0336107 A1 | 11/2019 | Hope Simpson et al. |
| 2020/0008163 A1 | 1/2020 | Black et al. |
| 2020/0083605 A1 | 3/2020 | Quarfoth et al. |
| 2020/0137698 A1 | 4/2020 | Black et al. |
| 2020/0186227 A1 | 6/2020 | Reider et al. |
| 2020/0205012 A1 | 6/2020 | Bengtsson et al. |
| 2020/0259552 A1* | 8/2020 | Ashworth .......... H04B 10/2589 |

(56) References Cited

U.S. PATENT DOCUMENTS

| | | | |
|---|---|---|---|
| 2020/0313741 A1 | 10/2020 | Zhu et al. | |
| 2020/0366363 A1 | 11/2020 | Li et al. | |
| 2020/0403689 A1 | 12/2020 | Rofougaran et al. | |
| 2021/0036437 A1 | 2/2021 | Zhang et al. | |
| 2021/0067237 A1 | 3/2021 | Sampath et al. | |
| 2021/0234591 A1 | 7/2021 | Eleftheriadis et al. | |
| 2021/0328664 A1* | 10/2021 | Schwab | H04B 7/2041 |
| 2021/0367684 A1 | 11/2021 | Bendinelli et al. | |
| 2021/0368355 A1* | 11/2021 | Liu | H04W 16/18 |
| 2022/0014933 A1 | 1/2022 | Moon et al. | |
| 2022/0053433 A1 | 2/2022 | Abedini et al. | |

FOREIGN PATENT DOCUMENTS

| | | | |
|---|---|---|---|
| CN | 106572622 A | 4/2017 | |
| CN | 106664124 A | 5/2017 | |
| CN | 106797074 A | 5/2017 | |
| CN | 110034416 A * | 7/2019 | H01Q 1/38 |
| EP | 3273629 A1 | 1/2018 | |
| JP | 61-1102 A | 1/1986 | |
| JP | 936656 A | 2/1997 | |
| JP | H09-214418 A | 8/1997 | |
| JP | 2000-111630 A | 4/2000 | |
| JP | 3307146 B2 | 7/2002 | |
| JP | 2004-270143 A | 9/2004 | |
| JP | 3600459 B2 | 12/2004 | |
| JP | 2007081648 A | 3/2007 | |
| JP | 2007306273 A | 11/2007 | |
| JP | 2008-153798 A | 7/2008 | |
| JP | 2009-514329 A | 4/2009 | |
| JP | 2010-226457 A | 10/2010 | |
| JP | 2011-507367 A | 3/2011 | |
| JP | 2011-508994 A | 3/2011 | |
| JP | 2012-175189 A | 9/2012 | |
| JP | 2013-539949 A | 10/2013 | |
| JP | 2014-075788 A | 4/2014 | |
| JP | 2014207626 A | 10/2014 | |
| JP | 2014-531826 A | 11/2014 | |
| JP | 2016-139965 A | 8/2016 | |
| JP | 2017-220825 A | 12/2017 | |
| JP | 2018-14713 A | 1/2018 | |
| JP | 2018-173921 A | 11/2018 | |
| JP | 2020-523863 A | 8/2020 | |
| JP | 2020-145614 A | 9/2020 | |
| KR | 10-2006-0031895 A | 4/2006 | |
| KR | 10-2008-0093257 A | 10/2008 | |
| KR | 10-2016-0072062 A | 6/2016 | |
| KR | 10 2016 0113100 A | 9/2016 | |
| TW | 202037208 A | 10/2020 | |
| WO | 2007001134 A1 | 1/2007 | |
| WO | 2010104435 A1 | 9/2010 | |
| WO | 2012050614 A1 | 4/2012 | |
| WO | 2012096611 A2 | 7/2012 | |
| WO | 2012161612 A1 | 11/2012 | |
| WO | 2013023171 A1 | 2/2013 | |
| WO | 2015196044 A1 | 12/2015 | |
| WO | 2016044069 A1 | 3/2016 | |
| WO | 2017008851 A1 | 1/2017 | |
| WO | 2017014842 A1 | 1/2017 | |
| WO | 2017193056 A1 | 11/2017 | |
| WO | 2018144940 A1 | 8/2018 | |
| WO | 2018179870 A1 | 10/2018 | |
| WO | 2020095597 A1 | 5/2020 | |
| WO | 2021003112 A1 | 1/2021 | |

OTHER PUBLICATIONS

Office Communication for U.S. Appl. No. 15/925,612 dated Jun. 15, 2018, pp. 1-9.
U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
International Search Report and Written Opinion for International Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.

(56) References Cited

OTHER PUBLICATIONS

Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/585,418 dated Apr. 8, 2022, pp. 1-9.
Office Communication for U.S. Appl. No. 17/537,233 dated Apr. 20, 2022, pp. 1-9.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for International Patent Application No. PCT/US2022/013942 dated May 10, 2022, pp. 1-8.
Qualcomm Incorporated, "Common understanding of repeaters," 3GPP TSG RAN WG4 #98_e R4-2102829, 2021, https://www.3gpp.org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/177,145 dated Jun. 3, 2022, pp. 1-5.
Office Communication for U.S. Appl. No. 17/585,418 dated Jul. 22, 2022, pp. 1-6.
Office Communication for U.S. Appl. No. 17/585,418 dated Aug. 4, 2022, pp. 1-2.
Office Communication for U.S. Appl. No. 17/306,361 dated Sep. 9, 2022, pp. 1-7.
Office Communication for U.S. Appl. No. 17/306,361 dated Sep. 27, 2022, pp. 1-7.
Office Communication for U.S. Appl. No. 17/379,813 dated Oct. 5, 2022, pp. 1-11.
Office Communication for U.S. Appl. No. 17/217,882 dated Oct. 13, 2022, pp. 1-14.
Office Communication for U.S. Appl. No. 17/397,442 dated Oct. 27, 2022, pp. 1-8.
Office Communication for U.S. Appl. No. 17/859,632 dated Oct. 27, 2022, pp. 1-12.
Falconer, David D. et al., "Coverage Enhancement Methods for LMDS," IEEE Communications Magazine, Jul. 2003, vol. 41, Iss. 7, pp. 86-92.
Office Communication for U.S. Appl. No. 17/708,757 dated Jan. 20, 2023, pp. 1-5.
Office Communication for U.S. Appl. No. 17/379,813 dated Feb. 3, 2023, pp. 1-10.
Office Communication for U.S. Appl. No. 17/112,895 dated Feb. 6, 2023, pp. 1-8.
Office Communication for U.S. Appl. No. 17/379,813 dated Feb. 15, 2023, pp. 1-3.
Office Communication for U.S. Appl. No. 17/859,632 dated Feb. 28, 2023, pp. 1-13.
International Search Report and Written Opinion for International Patent Application No. PCT/US2022/047909 dated Feb. 21, 2023, pp. 1-7.
Office Communication for Japanese Patent Application No. JP 2020-548724 dated Mar. 8, 2023, pp. 1-9.
International Search Report and Written Opinion for International Patent Application No. PCT/US2022/036381 dated Oct. 25, 2022, pp. 1-8.

(56) References Cited

OTHER PUBLICATIONS

Extended European Search Report for European Patent Application No. 20759272.6 dated Nov. 3, 2022, pp. 1-9.
Office Communication for U.S. Appl. No. 17/334,105 dated Nov. 30, 2022, pp. 1-7.
Shimura, Tatsuhiro et al., "A study of indoor area expansion by quasi-millimeter wave repeater," The Collection of Lecture Articles of the 2018 IEICE General Conference, Mar. 2018, pp. 1-5.
Office Communication for U.S. Appl. No. 17/217,882 dated May 15, 2023, pp. 1-6.
Office Communication for U.S. Appl. No. 17/859,632 dated May 16, 2023, pp. 1-4.
Office Communication for Japanese Patent Application No. JP 2021-505304 dated May 9, 2023, pp. 1-6.
Office Communication for U.S. Appl. No. 17/891,970 dated Jun. 16, 2023, pp. 1-11.
Office Communication for U.S. Appl. No. 17/397,442 dated Jun. 23, 2023, pp. 1-15.
Office Communication for U.S. Appl. No. 17/980,391 dated Jul. 3, 2023, pp. 1-9.
Office Communication for Japanese Patent Application No. JP 2020-548724 dated Jun. 15, 2023, pp. 1-5.
International Search Report and Written Opinion for International Patent Application No. PCT/US2023/018993 dated Jun. 27, 2023, pp. 1-9.
Office Communication for U.S. Appl. No. 18/136,238 dated Jul. 20, 2023, pp. 1-8.
Examination Report for European Patent Application No. 19772471.9 dated Jul. 28, 2023, pp. 1-4.
Communication for Chinese Patent Application No. 201980019925.1 dated Sep. 27, 2021, pp. 1-25.
Office Communication for Korean Patent Application No. KR 10-2020-7029161 dated Jul. 19, 2023, pp. 1-15.
Office Communication for U.S. Appl. No. 17/708,757 dated Aug. 4, 2023, pp. 1-8.
Office Communication for U.S. Appl. No. 17/859,632 dated Aug. 8, 2023, pp. 1-14.
Office Communication for U.S. Appl. No. 17/334,105 dated Aug. 11, 2023, pp. 1-16.

\* cited by examiner

INSTALLATION OF REPEATERS FOR A MILLIMETER WAVE COMMUNICATIONS NETWORK

CROSS-REFERENCE TO RELATED APPLICATION

This application is a Utility patent application based on previously filed U.S. Provisional Patent Application No. 63/138,306 filed on Jan. 15, 2021, the benefit of the filing date of which is hereby claimed under 35 U.S.C. § 119(e) and the contents of which is further incorporated in entirety by reference.

TECHNICAL FIELD

The invention relates generally to employing directional antennas placed on structures, such as poles, or buildings, that provide a wireless network for communicating RF signals between user devices and remotely located resources. Further, in some embodiments, the directional antennas may be installed at the premises of a customer and coupled to base stations and RF signal repeater devices to manage operation of a millimeter wave communications network.

BACKGROUND

Mobile devices have become the primary mode of wireless communication for most people throughout the world. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers and over shorter distances than lower frequency wireless signals. Moreover, since the recent rollout of 5th generation (5G) wireless communication networks that can use wireless signals with millimeter waveforms at gigahertz frequencies, it has become even more difficult to design and install 5G wireless networks that provide optimized access for mobile devices due to these physical barriers.

DESCRIPTION OF VARIOUS EMBODIMENTS OF THE INVENTION

Figure 1:
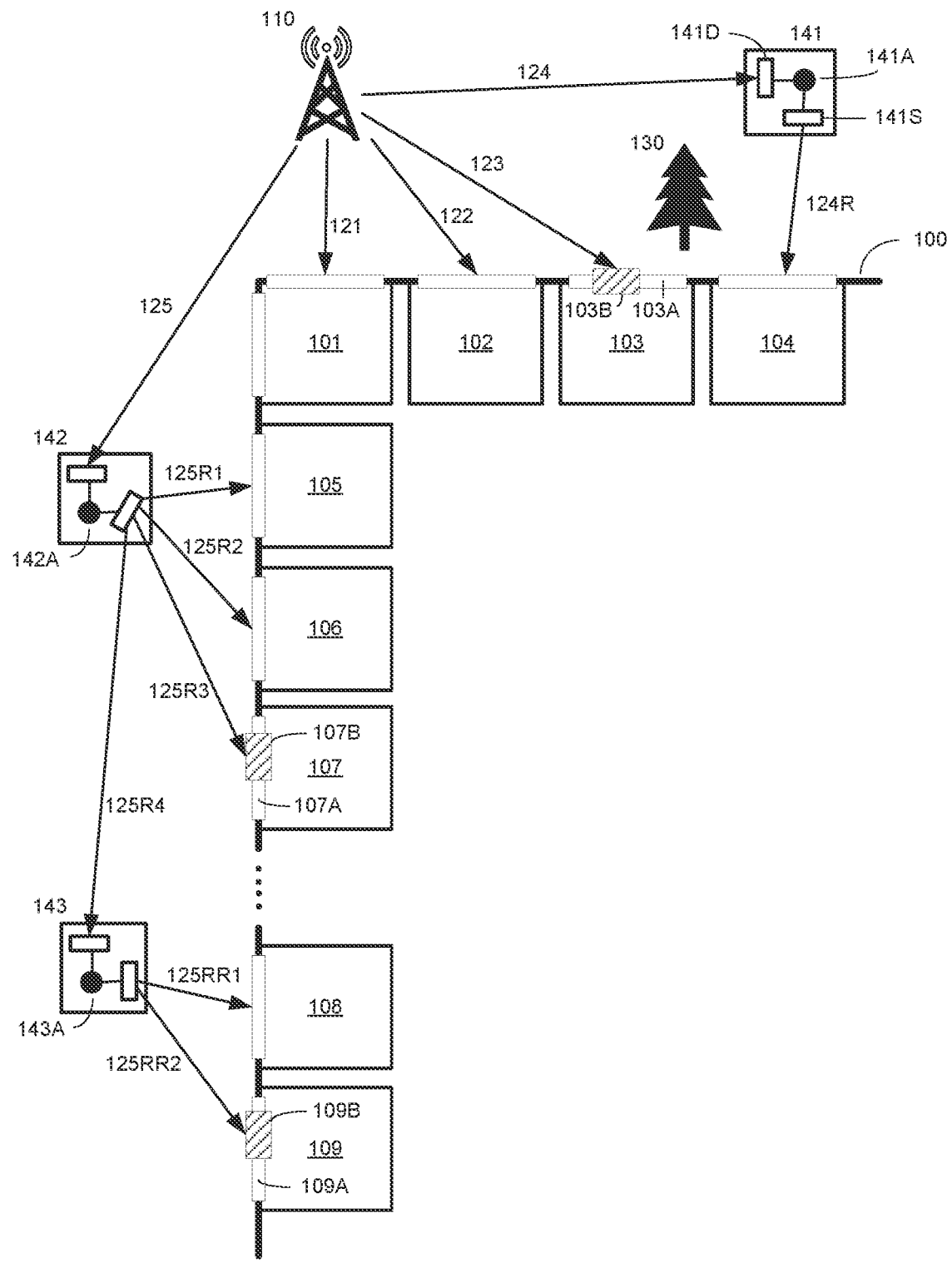
FIG. 1 depicts an illustrative scenario for providing wireless service to a multiple-dwelling unit (MDU).

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or system that provides a suite of devices and software tools executing on a computing device, e.g., a distributed cloud computing platform, a desktop computer, a notebook computer or a mobile device. One or more of the various embodiments of the devices and tools enable a user, such as a carrier, to extend millimeter wave coverage for wireless communication networks while reducing costs and optimizing coverage for different environments. In one or more of the various embodiments, the devices may include outdoor network repeaters, e.g., the Pivot 5G™, and indoor subscriber repeaters, e.g., the Echo 5G™. Also, in one or more embodiments, the software tools may include a beam management system, e.g., Pivotal Commware's Intelligent Beam Management System (IBMS), and an application, e.g., WaveScape™, for modeling and optimizing the placement of the Pivot 5G, Echo 5G, and other mmWave network transmitter devices in a mmWave network. In one or more of the various embodiments, WaveScape may orchestrate the other tools and devices by allowing carriers to plan their mmWave networks and quantify both the physical and economic impact each component has on the network.

Overview

Millimeter wave (mmWave) communication networks can deliver on low-latency applications that subscribers expect from 5G and on the capacity that carriers need to deliver for their subscribers. Limited line-of-sight (LOS) conditions and propagation challenges associated with mmWave dictate denser networks than ever before, and significant planning is required to balance densification with responsible capex. Legacy macro cell planning tools are not up to the task of modeling the small cell deployments, and many of the fundamental assumptions break down when simulating mmWave. To fully unlock the potential of this spectrum, carriers need an accurate and scalable modeling tool that is built natively on the physics of mmWave.

In some approaches, a mmWave ecosystem of products extends millimeter wave coverage at a fraction of the cost of gNB-only networks. This ecosystem can include at least two types of smart repeaters (an outdoor network repeater such as the Pivot 5G and an indoor subscriber repeater such as the Echo 5G), plus an internet-of-things (IoT) management system such as the Intelligent Beam Management System (IBMS), plus a software solution (hereinafter referred to as WaveScape) for modeling and optimizing the placement of Pivot 5G, Echo 5G, and all other mmWave network transmitters. WaveScape orchestrates this ecosystem, allowing users to plan their mmWave networks and quantify both the physical impact and efficiency of each component of the network.

In some approaches WaveScape is a network planning platform built with the needs of 5G mmWave and Fixed Wireless Access (FWA) at its core. It can model any set of network elements, including network repeaters such as holographic beamforming (HBF) network repeaters, and allows users to explore the tradeoffs different network deployment strategies. Furthermore, WaveScape can ingest high resolution GIS data, utilize propagation models such as 3GPP propagation models, and run natively in the cloud. This allows it to make accurate and deterministic predictions with near-infinite scalability.

FWA QUALIFICATION: WaveScape can ingest the network elements that have been deployed within a region as well as the physical layout of that region. The tool then identifies buildings that likely-subscribers occupy and determines the coverage level within and just outside the building, thus allowing carriers to qualify them for FWA based on minimum signal-level, antenna beamwidth, and placement requirements of different customer premise equipment (CPE).

NETWORK PLACEMENT OPTIMIZATION: WaveScape can allow users to set coverage targets for a region—which can be based on FWA scenarios or mobility scenarios. By ingesting utility poles, lampposts, and public building corners that a carrier may have access to, the tool can recommend placement and orientation of new network elements (including, e.g., Echo 5G, Pivot 5G, gNBs, or other equipment in use by the carrier) to reach a given target coverage level. Furthermore, the tool can dynamically ingest and re-optimize based on updated real estate requirements, new target metrics, and newly deployed equipment. Recommendations can be based on efficiency per incremental coverage basis, and the tool allows users to update and refine their efficiency models.

DEPLOYMENT STRATEGY & UNIT EFFICIENCY EXPLORATION: WaveScape allows carriers to explore different hypothetical deployment scenarios so they can uncover the most effective deployment strategy for a specific region. By tracking the incremental coverage of each network element, a carrier will be able to select efficient coverage targets for each region. Furthermore, WaveScape's ability to ingest specifications for any network element allows carriers to compare the efficiency features of all available equipment—including, e.g., both Pivot 5G and Echo 5G equipment.

Illustrative Scenario

With reference now to FIG. 1, an illustrative scenario is depicted. Various approaches involve identifying one or more potential recipients of wireless communications, and then recommending placements of repeaters to deliver signals between one or more wireless base stations and the one or more potential recipients. In this illustrative scenario, the one or more potential recipients are individual residences or premises 101-109 within a multiple dwelling unit (MDU) 100, with respective windows 101A-109A arranged along the exterior of the multiple dwelling unit 100. While the illustrative scenario depicts multiple premises within a single multiple dwelling unit, other approaches involve a set of single dwelling units, or a combination of single dwelling units and multiple dwelling units. Alternatively or additionally, approaches can include identifying one or more desired coverage regions for mobile recipients, e.g. pedestrians or vehicle occupants who are using mobile devices such as mobile phones.

In the illustrative scenario of FIG. 1, a wireless base station 110 is positioned north of the northwest corner of the MDU 100. The wireless base station could be, for example, a 5G gNB base station for mmW communications with recipients within a coverage area of the base station. In some approaches, the location of the wireless base station 110 is predetermined, e.g., previously selected and installed by a wireless service provider. In other approaches, as further discussed below, the WaveScape platform can recommend the placement of the wireless base station to efficiently provide optimized coverage within a selected service area.

In the illustrative scenario, the wireless base station 110 can directly provide service to premises 101 and 102 via lines of sight 121 and 122. The wireless base station 110 also has a direct line of sight 123 with premises 103; however, given the relatively oblique angle of incidence between line of sight 123 and window 103A, it may be desirable, in some approaches, to install a window repeater 103B in window 103A. In general, the Wavescape platform may recommend placement of a window repeater when the signal strength is sufficiently low and/or when the angle of incidence is sufficiently oblique.

Generally speaking, a window repeater, such as element 103B in FIG. 1, is a device installed on a window and configured to receive signals from a wireless base station (or from another repeater) and rebroadcast the received signals to premises behind the window. For two-way communication, the window repeater can also receive signals from the premises behind the window and rebroadcast them to a wireless base station (or another repeater) outside the window. The window repeater can be entirely mounted on the outside of the window, or entirely mounted on the inside of the window, or it can have exterior and interior portions that adjoin exterior and interior surfaces of the window. In some approaches, the window repeater includes a donor antenna that can be adjusted to point a beam at the relevant wireless base station (or other repeater) outside of the premises, and a service antenna providing a beam that covers the interior of the premises. The donor antenna and/or the service antenna can be electronically adjustable antennas such as holographic beamforming antennas. Various window repeater structures are described, for example, in U.S. Pat. Nos. 10,425,905 and 11,069,975, which are herein incorporated by reference.

In the illustrative scenario of FIG. 1, an obstruction 130 prevents a line of sight between the base station 100 and premises 104. The obstruction could be, for example, a tree or other vegetation, or some other physical structure such as a building or tower, or an interference source such as a base station from another wireless service provider. The obstruction 130 is depicted as a tree but this is a schematic depiction and is not intended to be limiting.

The WaveScape platform may recommend placement of an open-air repeater 141 to provide coverage to the premises 104. For example, having ingested geographic information that includes information about the locations of posts, poles, building corners, or other structures suitable for placement of open-air repeaters, the WaveScape platform may recommend placement of open-air repeater 141 on structure 141A, which could be a post, pole, building corner, or any other structure suitable for installation of an open-air repeater.

Generally speaking, an open-air repeater, such as element 141 in FIG. 1, is a device installed on a post, pole, building corner, or other structure and configured to receive signals from a wireless base station (or from another repeater) and rebroadcast the received signals. For example, the open-air repeater 141 can receive signals from wireless base station 101 via light of sight 124 and rebroadcast via line of sight 124R to premises 104. For two-way communication, the open-air repeater can also receive signals via line of sight 124R and rebroadcast them to the wireless base station via line of sight 124. In some approaches, the open-air repeater includes a donor antenna (e.g., 141D) that can be adjusted to point a beam at the relevant wireless base station (or other repeater), and a service antenna (e.g. 141S) providing a beam that covers a rebroadcast service area, e.g., including the premises 104 via line of sight 124R. The donor antenna and/or the service antenna can be electronically adjustable antennas such as holographic beamforming antennas. Various open-air repeater structures are described, for example, in U.S. Pat. Nos. 10,425,905; 11,190,266; and 11,206,055 which are herein incorporated by reference.

In the illustrative scenario of FIG. 1, the wireless base station 100, being situated north of the northwest corner of MDU 100, does not have a line of sight to provide service to units 105-109 on the west side of the MDU. In this context, the WaveScape platform may recommend placement of one or more open-air repeaters facing the west side of the MDU to provide service to the units 105-109. For example, the WaveScape platform may recommend placement of open-air repeater 142 at selected post, pole, building corner, or other structure 142S; and the WaveScape platform may further recommend placement of a second open-air repeater 143 at selected post, pole, building corner, or other structure 143S. The more distant repeater 143 may be required to accommodate for signal attenuation between repeaters 142 and 143, e.g., due to distance and/or the presence of attenuating features such as foliage. In this illustrative scenario, base station 110 broadcasts a signal 125 to open-air repeater 142; the signal 125 is rebroadcast via lines of sight 125R1, 125R2, 125R3 to premises 105, 106, and 107, respectively (with the 125R3 signal being further boosted by window repeater 107B due to angle of incidence and/or insufficient signal strength of 125R3); and the signal 125 is rebroadcast via line of sight 125R4 to be doubly rebroadcast via lines of sight 125RR1 and 125RR2 to units 108 and 109, respectively (with the 125RR2 signal being further boosted by window repeater 109B due to angle of incidence and/or insufficient signal strength of 125RR2).

Example 1: Multiple-Dwelling Unit

As a first validation of the utility of the WaveScape platform, a multiple-dwelling unit (MDU) was identified and targeted for fixed wireless access in each dwelling unit. The identified MDU is ten stories high and contains 70 units (7 units per floor). All units have a window on the west side of the building.

Wavescape models the baseline coverage of the gNBs and predicts both mobility coverage and FWA qualification. Using 3GPP propagation models on the highest-available resolution GIS data, the tool sees that while the northern face of the building has coverage, most of the potential subscribers (having windows on the west side of the building) are left in the dark. This prediction is validated by live measurements in the field, showing little to no coverage on the west face of the building.

WaveScape then ingests all the lampposts, utility poles, building corners, and any other locations in the area where open-air repeaters (e.g., Pivot repeaters) can be mounted. It then automatically calculates which of these candidate locations have adequate signal for the open-air repeaters to repeat, ensuring the repeaters' effectiveness. In this scenario, WaveScape has determined that the pole closer to the MDU does not have line of sight to the gNB, and thus is not eligible for an open-air repeater, but the poles across the street and to the southwest of the building do have sufficient coverage.

Now that WaveScape has found two poles in the area where a Pivot can be placed, it optimizes the configuration and orientation of the repeaters to provide maximum coverage at the least cost. WaveScape has found a configuration where only one of the poles is needed to provide coverage, saving the cost of an extra repeater on the other pole for the carrier.

When WaveScape's recommended configuration was put to the test at this MDU, its coverage level predictions were accurate, and it correctly qualified 100% of the units on the west face of the building.

Example 2: Polygon of Potential Subscribers

As a second validation of the utility of the WaveScape platform, a 1.5 square mile polygon containing 29 gNBs and 4900 potential subscribers was identified and targeted for fixed wireless access in each dwelling unit.

As was done in the previous example, WaveScape ingests all gNodeB locations and orientations within the polygon. It then evaluates mmWave coverage based on 3GPP models and high-resolution GIS data. This modeling calculation identified 1700 units with adequate coverage for FWA, or 35% of all dwelling units within the polygon.

Figure 2:
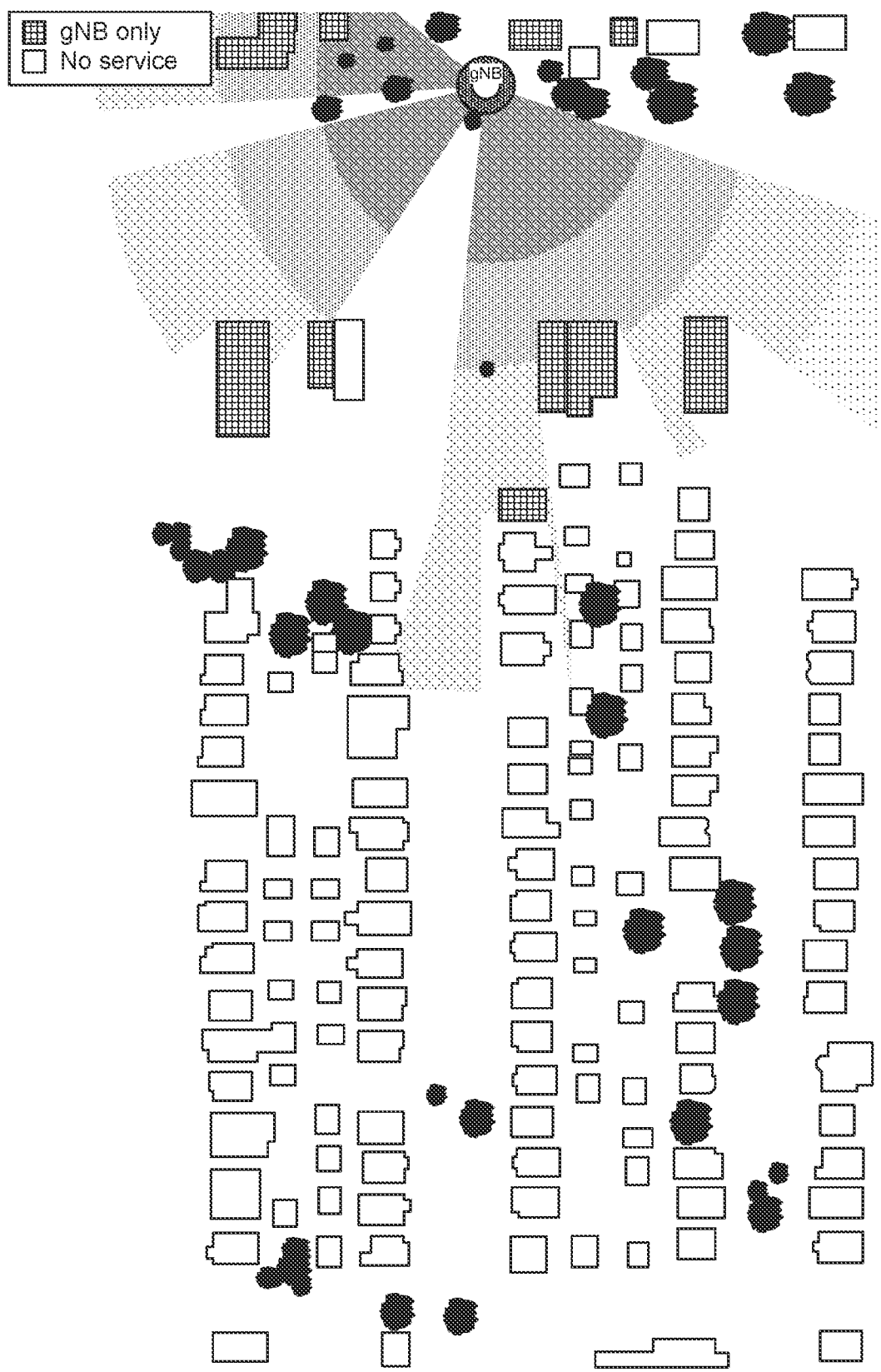
FIG. 2 depicts wireless coverage for a portion of a polygon of potential subscribers with only gNBs.

FIG. 2 depicts the result of this modeling for a portion of the polygon, showing that only the buildings at the top of the figure, near the gNB at top center, have adequate coverage for FWA.

To boost FWA enablement and mobility coverage, existing utility poles were made available by the local power company to mount open-air repeaters (e.g. Pivot repeaters). The locations and heights of over 5000 poles within the polygon were ingested by WaveScape. WaveScape identified 1750 poles that are covered by the existing gNBs. WaveScape also accounts for "two hop" scenarios, where a gNB provides coverage to a repeater, which then provides coverage to a second repeater thus further extending the network range and allowing the tool to qualify an additional 1250 poles (a "two hop" scenario is schematically depicted for repeater 143 in FIG. 1, as discussed above).

WaveScape can allow the user to define an optimal deployment strategy logic by looking at outdoor coverage, FWA enablement, and/or indoor coverage. In the present example, the network is optimized for FWA enablement using window repeaters (e.g. Echo repeaters) as customer premises equipment (CPE). With this optimization goal, WaveScape utilizes cloud computing to determine the optimal repeater locations and orientations based on the coverage outcomes. In some approaches, WaveScape can be a cloud-native application with near-infinite scalability to optimize coverage for polygons of any shape or size. Out of the more than 3000 eligible open-air repeater locations available in this scenario, WaveScape selected 171 open-air repeater locations, which allowed for 90% of units within the polygon to be enabled for FWA.

Figure 3:
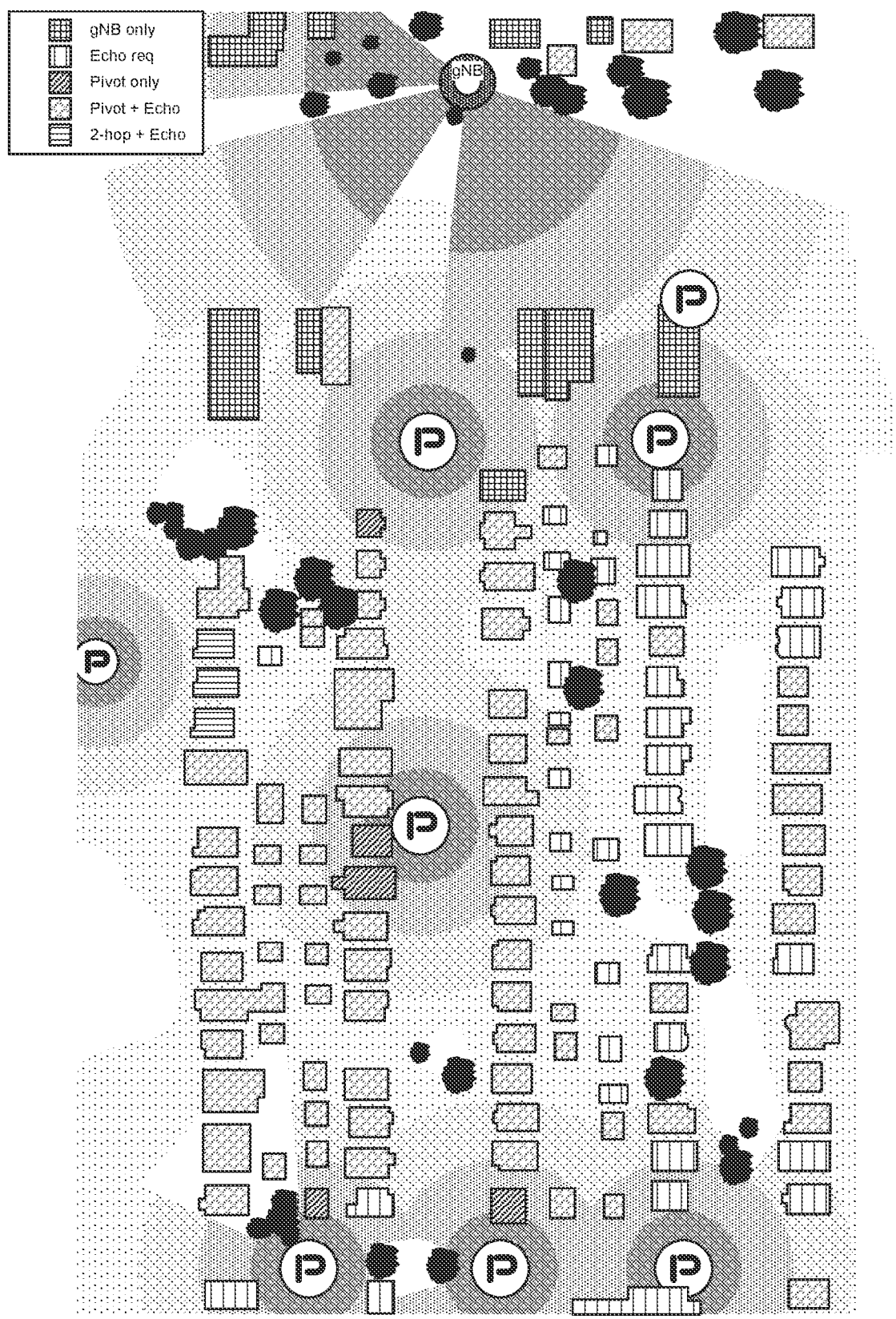
FIG. 3 depicts wireless coverage for the same portion of the polygon of potential subscribes with gNBs, open-air repeaters, and window repeaters.

FIG. 3 depicts the result of this optimization example for the same polygon portion that was depicted in FIG. 2, as discussed above. As a result of the optimization, open-air repeaters are variously positioned on utility poles within the polygon, as indicated by the repeater locations "P" in the figure. With the addition of these repeaters, and with the further addition of window repeaters (e.g. Echo devices), service can be provided to every premises within the polygon portion as shown.

Some premises (shaded as "gNB only") receive service directly via communication with the gNB. These are analogous to premises 101 and 102 in the schematic example of FIG. 1. Other premises (shaded as "Echo only") receive service via communication with the gNB that is boosted by a window repeater such as an Echo device. These are analogous to premises 103 in the schematic example of FIG. 1. Other premises (shaded as "Pivot only") receive service via communication with the gNB that is repeated by a single open-air repeater such as a Pivot device. These are analogous to premises 104, 105, and 106 in the schematic example of FIG. 1. Other premises (shaded as "Pivot+ Echo") receive service via communication with the gNB that is repeated by a single open-air repeater such as a Pivot device and then boosted by a window repeater such as an Echo device. These are analogous to premises 107 in FIG. 1. Finally, other premises (shaded as "2hop+Echo") receive service via communication with the gNB that is repeated by a series of two-open air repeaters such as Pivot devices and then boosted by a window repeater such as an Echo device. These are analogous to premises 109 in FIG. 1.

Efficiency Analysis

By tracking the individual contributions of each gNB and repeater within the network, WaveScape can compare the number of repeaters needed to achieve different target coverage levels. For the polygon of Example 2, alongside the 29 gNB, 56 open-air repeaters were required to reach 70% coverage, while 171 open-air repeaters were required to reach 90% coverage, meaning that it may be more efficient to target 70% coverage for this polygon.

In some approaches, WaveScape can be used to test many different hypothetical scenarios. For example, by removing the 5 least impactful gNBs from the polygon being considered, 70% coverage required 24 gNBs+63 open-air repeaters. While more Pivots are required than in the 29 gNB scenario, trading 5 gNBs for 7 Pivots was a more efficient deployment strategy overall.

Figure 4:
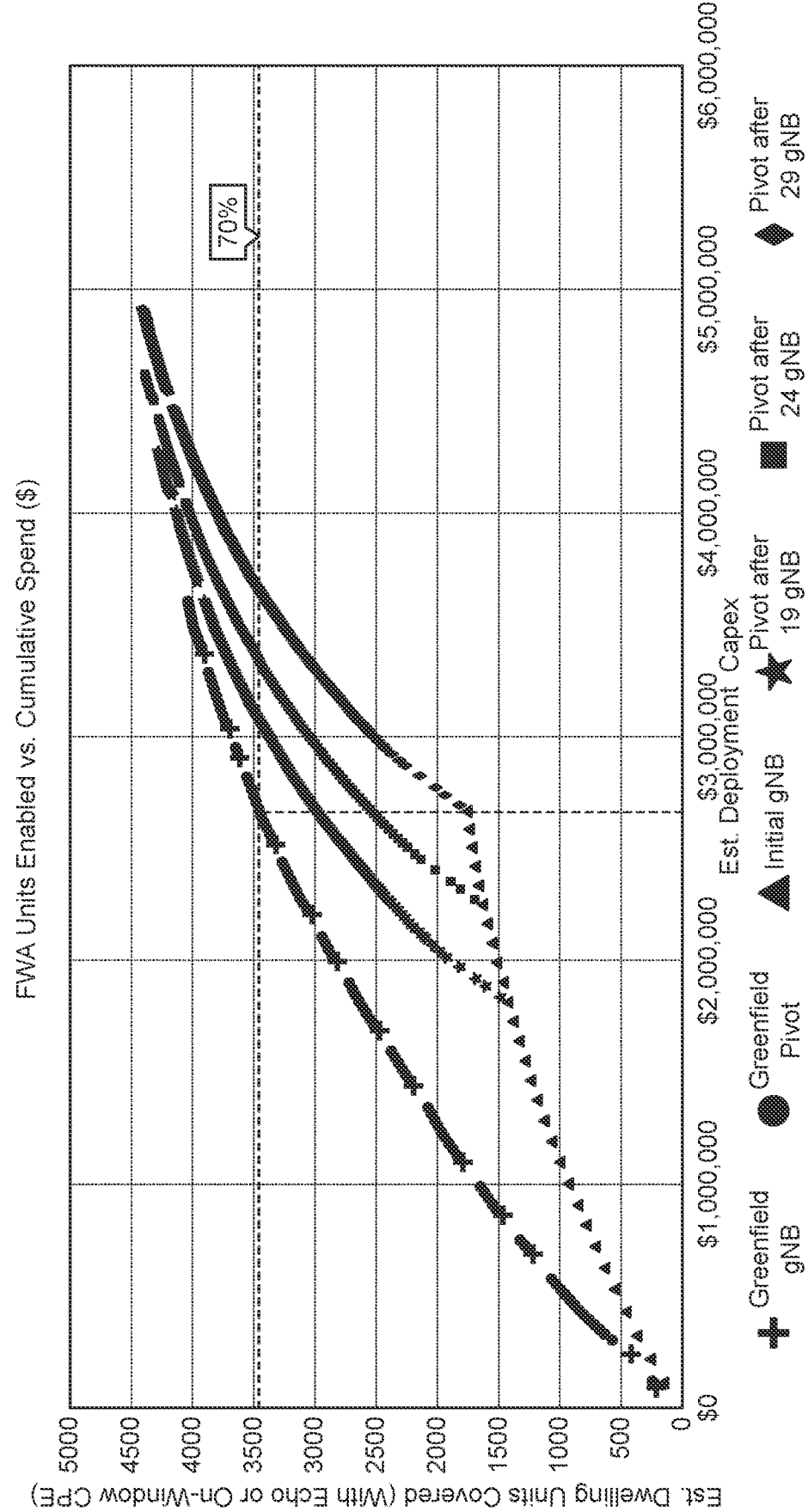
FIG. 4 depicts efficiency scenarios for various deployments of gNBs, open-air repeaters, and window repeaters.

With reference now to FIG. 4, several illustrative efficiency scenarios are depicted, plotting the cost of deployment on the horizontal axis versus the estimated coverage percentage on the vertical axis. The triangles indicate the initial deployment of 29 gNBs as discussed above in Example 2. With 29 gNBs already deployed, the diamonds indicate the additional coverage obtained by adding open-air repeaters. It can be seen that adding the open-air repeaters increases the total cost of deployment, but with greater incremental improvement in coverage percentage compared to, say, adding the 29th gNB.

In one efficiency scenario, the 5 least effective gNBs are removed. Then, with 24 gNBs already deployed, the squares indicate the additional coverage obtained by adding open-air repeaters. Again, it can be seen that adding the open-air repeaters increases the total cost of deployment, but with greater incremental improvement in coverage percentage compared to, say, adding the 24th gNB.

Taking this further, in another efficiency scenario, the 10 least effective gNBs are removed. Then, with 19 gNBs already deployed, the stars indicate the additional coverage obtained by adding open-air repeaters. Again, it can be seen that adding the open-air repeaters increases the total cost of deployment, but with greater incremental improvement in coverage percentage compared to, say, adding the 19th gNB.

The diamond, square, and star plots illustrate the trend of greater efficiency when fewer gNBs are previously deployed and WaveScape can optimize locations of more open-air repeaters. Taking this to a logical extreme, in one approach, no gNBs are previously deployed and WaveScape can optimize the locations of both the gNBs and the open-air repeaters. This can be referred to as a "green field" optimization of coverage for a selected set of potential subscribers in a selected service area such as the polygon of Example 2. In FIG. 4, the leftmost curve indicates an example of this optimization, with each cross (+) indicating a gNB located as recommended by WaveScape, and each dot indicating an open-air repeater (such as a Pivot device) located as recommended by WaveScape.

Process Flows

Figure 5:
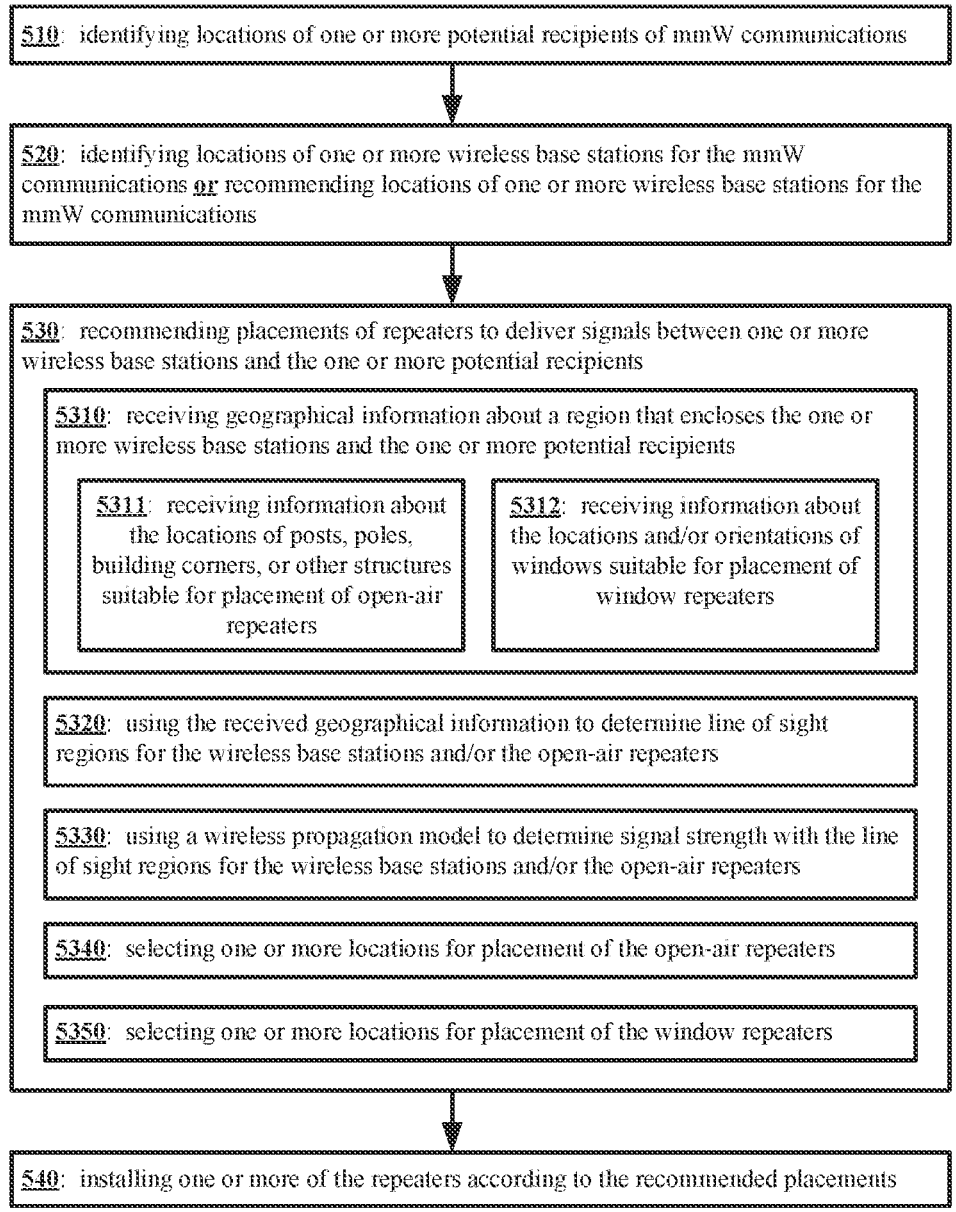
FIG. 5 depicts a process flow for recommending locations of repeaters.

With reference now to FIG. 5, an illustrative embodiment is depicted as a process flow diagram. The process 500 includes operation 510—identifying locations of one or more potential recipients of mmW communications. For example, the operation 510 can include, as in FIG. 1, identifying the locations of premises 101-109 within a multiple dwelling unit (MDU); or, as in FIGS. 2 and 3, identifying locations of potential wireless service subscribers within a service area. In some approaches, the identifying of the locations of the potential recipients is an identifying of one or more desired coverage regions for mobile recipients, e.g., pedestrians or vehicle occupants who are using mobile wireless devices such as mobile phones.

The process 500 further includes operation 520—identifying locations of one or more wireless base stations for the mmW communications or recommending locations of one or more wireless base stations for the mmW communications. If the operation includes identifying these locations, the identifying can include receiving a catalog of locations and orientations of previously-installed wireless base stations, e.g., gNBs. If the operation includes recommending these locations, the recommending can include recommending locations of wireless base stations, e.g., gNBs, to optimize coverage within a desired service area. For example, the operation can include recommending locations and orientations of gNBs according to a "green field" optimization algorithm as discussed above.

The process 500 further includes operation 530—recommending placements of repeaters to deliver signals between one or more wireless base stations and the one or more potential recipients. For example, the operation can include recommending placements of open-air repeaters 141, 142, and 143 and placements of window repeaters 103B, 107B, and 109B as in FIG. 1. As another example, the operation can include recommending placements of open-air repeaters "P" as in FIG. 3.

Operation 530 can include sub-operation 5310—receiving geographical information about a region that encloses the one or more wireless base stations and the one or more potential recipients. For example, sub-operation 5310 can include ingesting geographical information from a geographical information system (GIS) database. The GIS database can include, e.g., information about the ground topography, the footprints and heights of buildings or other man-made structures, and the locations and heights of trees or other vegetation. The GIS database information can include information about, e.g., density or species of vegetation, building materials (e.g., whether a building is wood frame or concrete-and-steel), locations of roads, building uses (e.g., whether a building is residential or commercial or mixed-use), population density, and local internet connective speeds.

Sub-operation 5310 can include sub-sub-operation 5311—receiving information about the locations of posts, poles, building corners, or other structures suitable for placement of open-air repeaters. For example, the GIS database can include information about the locations of posts, poles, corners, etc., or the GIS database can be supplemented with a catalog of this information, or machine learning algorithms can be used to identify potential locations of posts, poles, corners, etc. The received information about the locations of posts, poles, corners, etc. can include zoning, regulatory, and/or utility information about the availability and suitability of these locations for placement of open-air repeaters. The received information can include, e.g., information about the height, previously-installed equipment, comm-zone availability, and ownership of a given pole. In some approaches, the received information can include information about regions where a pole is not presently installed but could be installed.

Sub-operation 5310 can include sub-sub-operation 5312—receiving information about the locations and/or orientations of windows suitable for placement of window repeaters. For example, the GIS database can include information about the coordinates, altitudes, and orientations of windows on buildings (commercial buildings, single dwelling units, and multiple dwelling units), or the GIS database can be supplemented with a catalog of this information, or machine learning algorithms can be used to identify windows on buildings. The received information about windows can include information about, e.g., the field of view from the window into the premises (e.g., whether the window is a bedroom window or a living room window) and information about the wireless signal transmissibility of the window (e.g., whether the window is low-E glass).

Operation 530 can include sub-operation 5320—using the received geographical information to determine line of sight regions for the wireless base stations and/or the open-air repeaters. For example, the geographical information can include information about buildings or other man-made structures that can impede the line of sight of a wireless base station or open-air repeater. This can be especially relevant in dense urban environments, where city streets or avenues can be "urban canyons" that severely limit the line of sight of a given wireless base station or open-air repeater. The geographical information can also include information about natural terrain or foliage that can impede the line of sight of a wireless base station or open-air repeater.

Operation 530 can include sub-operation 5330—using a wireless propagation model to determine signal strength with the line of sight regions for the wireless base stations and/or the open-air repeaters. For example, the operation can include using a 3GPP or other propagation model to account for attenuation due to distance, terrain, foliage, etc. Thus, the wireless propagation modelling can determine, e.g., the strength of a signal transmitted by a gNB base station and received by an open-air or window repeater, or the strength of a signal transmitted by a first open-air repeater and received by a window repeater or second open-air repeater.

Operation 530 can include sub-operation 5340—selecting one or more locations for placement of the open-air repeaters. For example, the operation can include selecting locations for the placements of open-air repeaters 141, 142, and 142 in FIG. 1, or the locations of open-air repeaters "P" in FIG. 3.

Operation 530 can include sub-operation 5350—selecting one or more locations for placement of the window repeaters. For example, the operation can include selecting placements of window repeaters 103B, 107B, and 109B on windows 103A, 107A, and 109A, respectively, in FIG. 1, or in the windows of premises shaded as "Echo req," "Pivot+Echo," or "2-hop+Echo" in FIG. 3.

The process 500 can further include operation 540—installing one or more of the repeaters according to the recommended placements. Thus, the process can include physically installing one or more of the open-air repeaters or window repeaters in the recommended locations.

Illustrative Computation Environment

Figure 6:
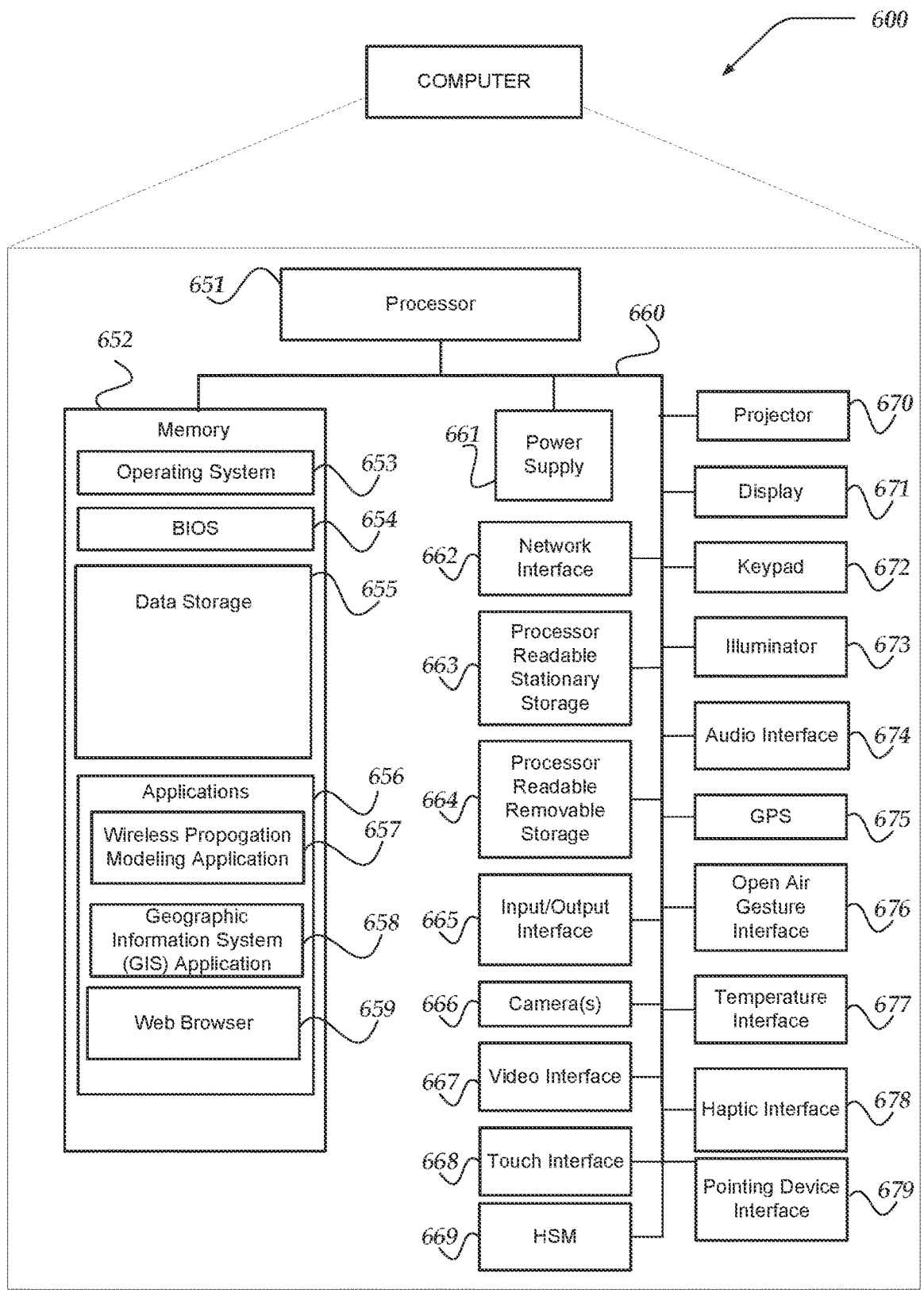
FIG. 6 shows an exemplary computer device that may be included in a system in accordance with the various embodiments.

FIG. 6 shows one embodiment of computer 650 that may include many more, or less, components than those shown. In one or more embodiments, the operation and/or configuration of computer 650 may be included in a distributed cloud computing platform, a remote computer or remote computing system, a local computer or local computing system, a desktop computer, a notebook computer or a mobile device.

Computer 650 may include processor 651 in communication with memory 652 via bus 660. Computer 650 may also include power supply 661, network interface 662, audio interface 674, display 671, keypad 672, illuminator 673, video interface 667, input/output interface 665, haptic interface 678, global positioning systems (GPS) receiver 675, open air gesture interface 676, temperature interface 677, camera(s) 667, projector 670, pointing device interface 679, processor-readable stationary storage device 663, and processor-readable removable storage device 664. Computer 650 may optionally communicate with a wireless base station (not shown), an wireless repeater device Snot shown) or directly with another computer. Power supply 661 may provide power to computer 650. A rechargeable or non-rechargeable battery may be used to provide power. The power may also be provided by an external power source, such as an AC adapter or a powered docking cradle that supplements or recharges the battery.

Network interface 662 includes circuitry for coupling computer 650 to one or more networks, and it is constructed for use with one or more wired and/or wireless communication protocols and technologies. Examples of various generations (e.g., third (3G), fourth (4G), or fifth (5G) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

Audio interface 674 may be arranged to produce and receive audio signals such as the sound of a human voice. For example, audio interface 674 may be coupled to a speaker and microphone (not shown) to enable telecommunication with others or generate an audio acknowledgement for some action. A microphone in audio interface 674 can also be used for input to or control of computer 650, e.g., using voice recognition, detecting touch based on sound, and the like.

Display 671 may be a liquid crystal display (LCD), gas plasma, electronic ink, light emitting diode (LED), Organic LED (OLED) or any other type of light reflective or light transmissive display that can be used with a computer. Display 671 may also include a touch interface 668 arranged to receive input from an object such as a stylus or a digit from a human hand, and may use resistive, capacitive, surface acoustic wave (SAW), infrared, radar, or other technologies to sense touch or gestures.

Projector 670 may be a remote handheld projector or an integrated projector that is capable of projecting an image on a remote wall or any other reflective object such as a remote screen.

Video interface 667 may be arranged to capture video images, such as a still photo, a video segment, an infrared video, or the like. For example, video interface 667 may be coupled to a digital video camera, a web-camera, or the like. Video interface 667 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 672 may comprise any input device arranged to receive input from a user. For example, keypad 672 may include a push button numeric dial, or a keyboard. Keypad 672 may also include command buttons that are associated with selecting and sending images.

Illuminator 673 may provide a status indication or provide light. Illuminator 673 may remain active for specific periods of time or in response to event messages. For example, when illuminator 673 is active, it may backlight the buttons on keypad 672 and stay on while the computer is powered. Also, illuminator 673 may backlight these buttons in various patterns when particular actions are performed, such as dialing another computer. Illuminator 673 may also enable light sources positioned within a transparent or translucent case of the computer to illuminate in response to actions.

Further, computer 650 may also comprise hardware security module (HSM) 669 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 669 may be a stand-alone computer, in other cases, HSM 669 may be arranged as a hardware card that may be added to a computer.

Computer 650 may also comprise input/output interface 665 for communicating with external peripheral devices or other computers such as other computers and network computers. The peripheral devices may include an audio headset, virtual reality headsets, display screen glasses, remote speaker system, remote speaker and microphone system, and the like. Input/output interface 665 can utilize one or more technologies, such as Universal Serial Bus (USB), Infrared, WiFi, WiMax, Bluetooth™, and the like.

Input/output interface 665 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to computer 650.

Haptic interface 678 may be arranged to provide tactile feedback to a user of the computer. For example, the haptic interface 678 may be employed to vibrate computer 650 in a particular way when another user of a computer is calling. Temperature interface 677 may be used to provide a temperature measurement input or a temperature changing output to a user of computer 650. Open air gesture interface 676 may sense physical gestures of a user of computer 650, for example, by using single or stereo video cameras, radar, a gyroscopic sensor inside a computer held or worn by the user, or the like. One or more cameras 666 may be used by an application to employ facial recognition methods to identify a user, track the user's physical eye movements, or take pictures (images) or videos.

GPS device 675 can determine the physical coordinates of computer 650 on the surface of the Earth, which typically outputs a location as latitude and longitude values. GPS device 675 can also employ other geo-positioning mechanisms, including, but not limited to, triangulation, assisted GPS (AGPS), Enhanced Observed Time Difference (E-OTD), Cell Identifier (CI), Service Area Identifier (SAI) Tracking Area Identifier (TAI), Enhanced Timing Advance (ETA), Base Station Subsystem (BSS), or the like, to further determine the physical location of computer 650 on the surface of the Earth. It is understood that GPS device 675 can employ a gyroscope to determine an orientation and/or an accelerometer to determine movement of the computer 650. In one or more embodiment, however, computer 650 may, through other components, provide other information that may be employed to determine a physical location of the computer, including for example, a Media Access Control (MAC) address, IP address, and the like.

Human interface components can be peripheral devices that are physically separate from computer 650, allowing for remote input or output to computer 650. For example, information routed as described here through human interface components such as display 671 or keypad 672 can instead be routed through network interface 662 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™ Zigbee™ and the like. One non-limiting example of a computer with such peripheral human interface components is a wearable computer, which might include a remote pico projector along with one or more cameras that remotely communicate with a separately located computer to sense a user's gestures toward portions of an image projected by the pico projector onto a reflected surface such as a wall or the user's hand.

Computer 650 may include wireless propagation modeling application 657 (WPM) that may be configured to remotely model propagation of wireless signals at one or more locations in one or more wireless networks. For example, WPM may model propagation of wireless signals according to a 3GPP or similar wireless signal propagation model, which may account for, e.g., attenuation due to distance, attenuation due to intervening foliage, etc. WPM 657 may employ geographical information provided by Geographic Information System (GIS) application 658 regarding the one or more locations. In one or more embodiments, WPM 658 may utilize an IoT network to communicate with the at least a portion of the elements in the one or more wireless networks, including the plurality of wireless signal repeater devices.

Computer 650 may include web browser application 659 that is configured to receive and to send web pages, web-based messages, graphics, text, multimedia, and the like. For example, the web browser application may provide graphical depictions of coverages areas, analogous to the shadings of the various coverage areas as depicted in FIG. 3. The computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 652 may include Random Access Memory (RAM), Read Only Memory (ROM), or other types of memory. Memory 652 illustrates an example of computer-readable storage medium (devices) for storage of information such as computer-readable instructions, data structures, program modules or other data. Memory 652 may store BIOS 654 for controlling low-level operation of computer 650. The memory may also store operating system 653 for controlling the operation of computer 650. It will be appreciated that this component may include a general-purpose operating system such as a version of UNIX, or LINUX™, or a specialized computer communication operating system such as Windows Phone™, Apple iOS™ or the Symbian® operating system. The operating system may include, or interface with a Java virtual machine module that enables control of hardware components or operating system operations via Java application programs.

Memory 652 may further include one or more data storage 655, which can be utilized by computer 650 to store, among other things, applications 656 or other data. For example, data storage 655 may also be employed to store information that describes various capabilities of computer 650. The information may then be provided to another device or computer based on any of a variety of methods, including being sent as part of a header during a communication, sent upon request, or the like. Data storage 655 may also be employed to store social networking information including address books, buddy lists, aliases, user profile information, or the like. Data storage 655 may further include program code, data, algorithms, and the like, for use by a processor, such as processor 651 to execute and perform actions. In one embodiment, at least some of data storage 655 might also be stored on another component of computer 650, including, but not limited to, non-transitory processor-readable removable storage device 664, processor-readable stationary storage device 663, or even external to the computer.

Applications 656 may include computer executable instructions which, when executed by computer 650, transmit, receive, or otherwise process instructions and data. Applications 656 may include, for example, WPM application 657, GIS application 658, web browser 659, or the like. Computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), computer 650 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), computer 650 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Also, in one or more embodiments, a system may comprise one or more processors and one or more memories that store instructions. Further, the one or more processors that execute the instructions may be configured to carry out any of the methods disclosed herein including, but not limited to, the claimed embodiments of Claims' 1-24.

Additionally, in one or more embodiments, a computer-readable non-transitory medium may be arranged to store instructions. Further, one or more processors that execute the instructions may be configured to carry out any of the methods disclosed herein including, but not limited to, the claimed embodiments of Claims' 1-24.

What is claimed as new and desired to be protected by Letters Patent of the United States is:

1. A method, comprising:
    identifying locations of one or more potential recipients of millimeter wave (mmWave) communications from an existing arrangement of one or more wireless base stations, wherein the mmWave communications is configurable to provide the one or more potential recipients with fixed wireless access with a selected carrier for dwelling units in a selected multiple-dwelling unit (MDU);

determining a set of candidate locations based on ingested geographic information that includes information corresponding to locations of posts, poles, building corners, or other structures suitable for placement of open-air repeaters for the selected carrier;

determining placement and configuration of one or more open-air repeaters for recommendation to deliver signals between the one or more wireless base stations in the existing arrangement and the one or more potential recipients;

wherein the determining includes selecting locations for the one or more open-air repeaters from the ingested set of candidate locations;

wherein the open-air repeaters are configured to receive signals via line of sight with the one or more wireless base stations and rebroadcast the received signals beyond line of sight of the one or more wireless base stations;

wherein the determining of the placement and configuration of the one or more open-air repeaters is a determining based on efficiency per incremental coverage; and wherein increased incremental coverage is an increase in an estimated number of dwelling units covered by the open-air repeaters.

2. The method of claim 1, further comprising:
identifying locations of the one or more wireless base stations for the mmWave communications.

3. The method of claim 1, further comprising:
recommending locations of the one or more wireless base stations for the mmWave communications.

4. The method of claim 1, wherein the one or more wireless base stations include one or more fifth generation (5G) Next Generation NodeB (gNB) base stations.

5. The method of claim 1, wherein the potential recipients include stationary recipients.

6. The method of claim 5, wherein the stationary recipients include fixed wireless access (FWA) recipients.

7. The method of claim 1, wherein the potential recipients include mobile recipients and the identifying of the locations of the mobile recipients is an identifying of a desired coverage region for mmWave communications with the mobile recipients.

8. The method of claim 1, wherein the repeaters include window repeaters to be positioned on windows, and where the window repeaters are configured to receive signals via line of sight with the one or more wireless base stations and rebroadcast the received signals to premises behind the windows.

9. The method of claim 8, wherein the line of sight is an unobstructed line of sight.

10. The method of claim 8, wherein the line of sight is a partially obstructed line of sight.

11. The method of claim 1, wherein the determining of the placement and configuration of the one or more open-air repeaters is a plurality of determinations of placements and configurations for a respective plurality of open-air repeaters;

wherein the plurality of determinations corresponds to a respective plurality of the increased incremental coverage provided by the respective plurality of open-air repeaters; and wherein the plurality of the increased incremental coverages is ordered.

12. The method of claim 11, wherein the repeaters include window repeaters to be positioned on windows, where the window repeaters are configured to receive signals via line of sight with the one or more wireless base stations or with the open-air repeaters and rebroadcast the received signals to premises behind the windows.

13. The method of claim 12, wherein the recommending of placements of repeaters includes:
receiving geographical information about a region that encloses the one or more wireless base stations and the one or more potential recipients; and
using the received geographical information to determine line of sight regions for the wireless base stations.

14. The method of claim 13, further comprising:
using a wireless propagation model to determine signal strength within the line of sight regions for the wireless base stations.

15. The method of claim 14, wherein the determined signal strength is determined with a parallelized computation process.

16. The method of claim 13, further comprising:
using the received geographical information to determine line of sight regions for the open-air repeaters.

17. The method of claim 16, further comprising:
using a wireless propagation model to determine signal strength within the line of sight regions for the open-air repeaters.

18. The method of claim 12, wherein the recommending of placements of repeaters includes:
receiving information about the locations of posts, poles, building corners, or other structures suitable for placement of the open-air repeaters; and
selecting one or more of the locations for placement of the open-air repeaters.

19. The method of claim 12, wherein the recommending of placements of repeaters includes:
receiving information about the locations and/or orientations of windows suitable for placement of the window repeaters; and
selecting one or more of the locations for placement of the window repeaters.

20. The method of claim 19, wherein the selecting of the one or more locations for placement of the window repeaters includes:
selecting the one or more locations based at least partially on angle of incidence of signals from the one or more wireless base stations or the one or more open-air base repeaters.

21. The method of claim 1, wherein the recommending of placements of repeaters includes:
receiving information about costs of installation and/or maintenance of the repeaters; and recommending placements of the repeaters to optimize coverage to the potential recipients within a cost constraint.

22. The method of claim 1, wherein the recommending is recommending based on cloud computation.

23. The method of claim 1, further comprising: installing one or more of the repeaters according to the recommended placements.

24. A computer, comprising:
one or more processors; and
one or more memories coupled to the one or more processors and having instructions stored thereon, wherein the one or more processors executing the instructions that are configured to cause performance of the method of claim 1.

25. A non-transitory computer-readable medium having instructions stored thereon, wherein one or more processors that execute the instructions that are configured to cause performance of the method of claim 1.

26. The method of claim 1, wherein the repeaters include one or more electronically adjustable antennas that are configurable to point beams at the one or more wireless base stations.

27. The method of claim 26, wherein the electronically adjustable antennas include holographic beamforming antennas.

* * * * *